A. P. PEABODY.
Animal-Trap.
No. 215,390. Patented May 13, 1879.
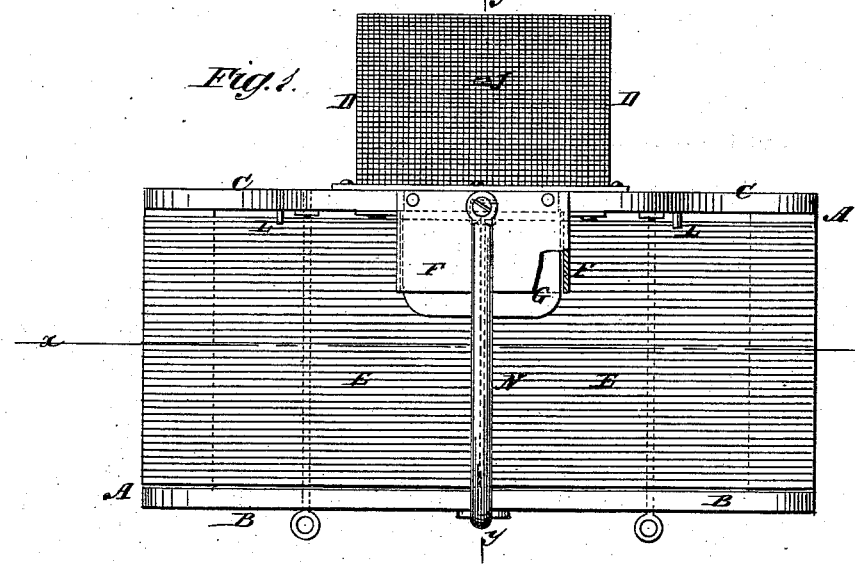
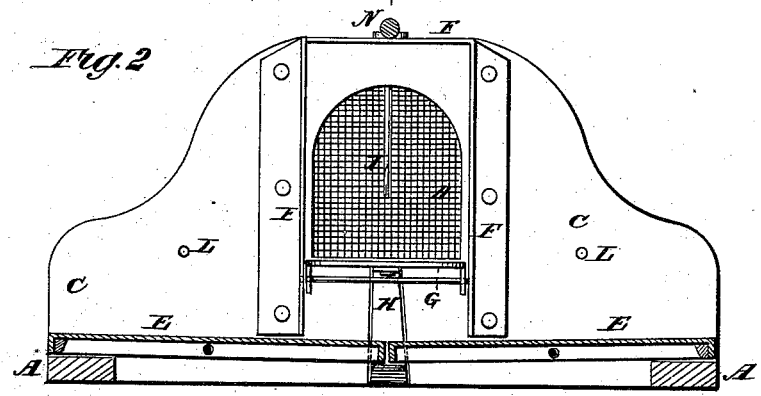
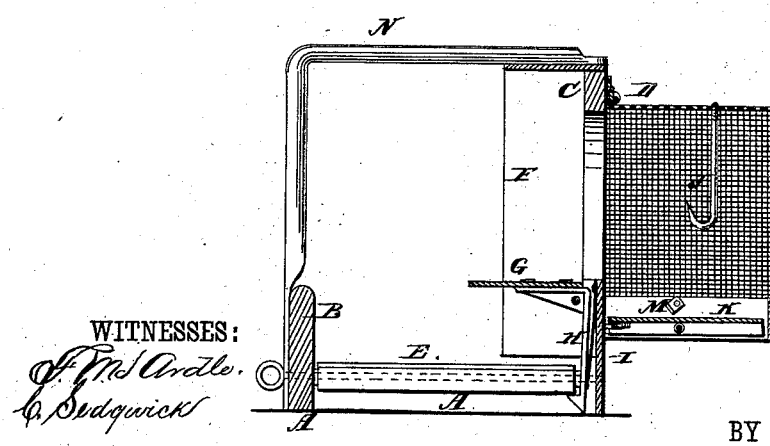
WITNESSES:
INVENTOR:
A. P. Peabody
BY
ATTORNEYS.

UNITED STATES PATENT OFFICE.

ALBION P. PEABODY, OF HOLDEN, MISSOURI.

IMPROVEMENT IN ANIMAL-TRAPS.

Specification forming part of Letters Patent No. 215,390, dated May 13, 1879; application filed January 11, 1879.

*To all whom it may concern:*

Be it known that I, ALBION P. PEABODY, of Holden, in the county of Johnson and State of Missouri, have invented a new and useful Improvement in Animal-Traps, of which the following is a specification.

Figure 1 is a top view of my improved trap. Fig. 2 is a vertical longitudinal section of the same, taken through the line $x\,x$, Fig. 1. Fig. 3 is a vertical cross-section of the same, taken through the line $y\,y$, Fig. 1.

Similar letters of reference indicate corresponding parts.

The object of this invention is to furnish an improved trap for catching rats, mice, and other small animals, which shall be simple in construction and automatic in operation, instantly resetting itself as each animal is caught.

The invention consists in an improved animal-trap formed of the frame, the low side board, the high side board, having an opening formed through its middle part, and provided with a flange around the said opening, the pivoted platform, provided with the catch-arm and spring, the two weighted trip-doors, the wire cage, provided with the weighted trip-door, the bait-hook, and the brace-rod, as hereinafter fully described.

A is a rectangular frame, of convenient size. To the forward side of the frame A is attached a side board, B, of sufficient height to induce the animals to pass in at the end of the frame. To the rear side of the frame A is attached a high side board, C, the upper corners of which may be cut away, and through the center of which is formed a hole of more than sufficient size to allow the animals trapped for to pass through. To the outer side of the side board C, around the opening formed through it, is attached a wire cage, D.

The frame A is covered by two doors, E, the inner edges of which meet in the middle parts of the said frame A, and which are pivoted at the middle part of their side edges to the side bars of the said frame A. The outer ends of the doors E are weighted sufficiently to bring them into and hold them in a horizontal position when left free.

To the side board C, around the opening formed through it, is attached a flange, F, to which, at the bottom of the said opening, is pivoted the edge of a horizontal platform, G. To the platform G is attached an arm, H, which projects downward from its pivoted edge along the side board C, or through a recess formed in the said side board. The lower end of the arm H is beveled, and has a shoulder formed upon it to receive and hold the inner corners of the trap-doors E, so as to hold them in a horizontal position while the animal is walking over them. The arm H is held outward by a spring, I, interposed between it and the side board C, so as to hold the platform G in a horizontal position.

From the top of the cage D is suspended a hook, J, to receive the bait. To the sides of the cage D, near their lower edges, is pivoted a door, K, the inner edge of which is weighted sufficiently to raise the said door into and hold it in a horizontal position.

To the side board C are attached stop-pins L, and to the side of the cage D is attached a stop-flange, M, to prevent the doors E K from swinging down too far. To the middle part of the side board B, and to the middle part of the top edge of the side board C, are attached the ends of a bent rod, N, which serves as a brace to strengthen the trap, and as a handle for carrying it from place to place.

The trap when being used is designed to be placed over a barrel or other vessel partly filled with water.

With this construction the doors E will be held firm and steady while the animal is walking over them; but when he sees the bait through the opening in the side board C, and puts his feet upon the platform G in attempting to get the said bait, his weight will depress the said platform and withdraw the catch-arm H from the doors E, allowing the said doors to tilt, and depositing the animal in the water-vessel beneath the trap. As the animal slips from the tilting doors E the said doors at once return to their former position, and the trap is set for another animal.

In case the animal be so light that his weight will not move the platform G and release the doors E, as soon as he steps upon the door K the said door will tilt, and deposit him in the water-vessel, the said door K being so balanced that the least weight will tilt it.

I am aware that it is not new in animal-traps to use a platform with a catch-arm and spring to operate the catch, or a catch-arm for supporting the trip-door, or a trip-door of similar construction to mine; but

What I claim is—

The combination of the frame A, the low side board B, the high side board C, having a middle aperture, with the flange F around it, the pivoted platform G, having arm H and spring I, the weighted trip-doors E, the wire cage D, having weighted trip-door K, the bait-hook J, and the brace-rod N, as and for the purpose specified.

ALBION PERL PEABODY.

Witnesses:
JEHU D. JACKSON,
E. K. WHITMORE.